United States Patent [19]
Holm et al.

[11] Patent Number: 5,873,810
[45] Date of Patent: *Feb. 23, 1999

[54] CENTRIFUGE APPARATUS WITH CONTAINER LOCKING MEANS

[75] Inventors: Niels Erik Holm, Birkerød, Denmark; Raymond Carr, Largo, Fla.; Niels Hvid, Holte, Denmark; Louis Andersen; Jesper Jørgensen, both of Stensved, Denmark

[73] Assignee: Bristol-Myers Squibb Company, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 761,465

[22] Filed: Dec. 6, 1996

Related U.S. Application Data

[60] Provisional application No. 60/008,236 Dec. 7, 1995.

[51] Int. Cl.[6] .............................. B04B 7/06; B04B 15/00
[52] U.S. Cl. ................................ 494/12; 494/84
[58] Field of Search ................................ 494/12, 41, 43, 494/47, 65, 83, 84, 85; 210/782

[56] References Cited

U.S. PATENT DOCUMENTS

| | | | |
|---|---|---|---|
| 3,073,517 | 1/1963 | Pickels et al. | 494/12 X |
| 3,581,981 | 6/1971 | Latham, Jr. | |
| 3,706,412 | 12/1972 | Latham, Jr. | 494/84 X |
| 4,140,268 | 2/1979 | Lacour. | |
| 4,718,888 | 1/1988 | Darnell | 494/85 |
| 4,795,419 | 1/1989 | Yawn | 494/84 |
| 5,062,826 | 11/1991 | Mantovani et al. | 494/12 X |
| 5,312,319 | 5/1994 | Salter | 494/12 |
| 5,505,683 | 4/1996 | Geringer et al. | 494/12 |
| 5,591,113 | 1/1997 | Darnell et al. | 494/12 |
| 5,658,231 | 8/1997 | Schmitt et al. | 494/12 |

*Primary Examiner*—Charles E. Cooley
*Attorney, Agent, or Firm*—Theodore R. Furman, Jr.; John M. Kilcoyne; Stuart E. Krieger

[57] ABSTRACT

An apparatus for centrifuging and furthermore automatically handling a container (10) for separating a component, such as fibrin monomer, from plasma, where the container (10) comprises a cylindrical member (11) with a lower rim as well as a piston member (12) with a tubular piston rod (12) projecting upwardly from the upper end of the cylindrical member (11). The apparatus comprises a supporting turntable (1) with a first gripping member (27) releasably gripping the lower rim of the cylindrical member (11) when the container is placed thereon, the supporting turntable being connected to a first activator (5) for rotating the turntable (1) with the container (10) about the central axis thereof. Furthermore, the apparatus comprises a rotatably journalled piston activating mechanism adapted to activate the piston (12) by way of a second activator (21) and provided with a second gripping member (13) for releasably gripping the piston rod (12). The first gripping member (27) is adapted to automatically enter a locking engagement with the inner side of the cylindrical member (11) independent of the rotating position of the container (10) relative to the supporting turntable (1) and upon activation of a third activator (8) when the container (10) is placed on the supporting turntable (1). The second gripping member (13) is adapted to succeedingly and automatically enter a locking engagement with the piston rod (12) upon activation of a fourth activator (15).

23 Claims, 4 Drawing Sheets

CENTRIFUGE APPARATUS WITH CONTAINER LOCKING MEANS

TECHNICAL FIELD

This application is based upon U.S. provisional application Ser. No. 60/008,236, filed Dec. 7, 1995, now abandoned, entitled "Centrifuge Apparatus".

This invention relates to novel locking mechanisms to releasably secure a container into a centrifuge apparatus.

More particularly, the invention relates to an apparatus for centrifuging and furthermore automatically handling a container for separating a component from a liquid, e.g., blood. In a preferred embodiment the apparatus can separate a component such as fibrin monomer, from plasma, where said container comprises a cylindrical member with a lower rim, said container further comprising a piston member with a tubular piston rod projecting upwardly from the upper end of the cylindrical member, and where said apparatus comprises a supporting turntable with a first gripping means releasably gripping the lower rim of the cylindrical member when the container is placed thereon, said supporting turntable being connected to a first activating means for rotating the turntable with the container about the central axis thereof, and where said apparatus further comprises a rotatably journalled piston activating mechanism adapted to activate the piston by means of a second activating means and provided with a second gripping means for releasably gripping said piston rod.

BACKGROUND ART

PCT applications WO 96/16715, WO 96/16714 and WO 96/16713 disclose a method and a container for separating a component, such as fibrin 1, from blood, by centrifugation, whereby blood admixed an anticlotter is fed to a first annular chamber in a device, where the annular chamber is defined by a cylindrical outer wall and a cylindrical inner wall, both walls extending coaxially about a common axis, as well as by a top wall and a bottom wall. The top wall is formed by a piston body displaceable within the first chamber. This method involves a centrifugation of the device about the said common axis to substantially separate blood into a cell fraction and a plasma fraction followed by the resulting plasma fraction being transferred while influenced by the piston body to a second chamber defined by an outer cylindrical wall. The outer cylindrical wall extends coaxially with the said common axis, whereby a fraction with fibrin 1 is caused to be separated in the second chamber while a suitable enzyme is being added. The separation of fibrin 1 from the plasma fraction in the second chamber is carried out during continued centrifugation whereby said fibrin 1 is deposited on the cylindrical outer wall of said second chamber, whereafter the fluid fraction collected at the bottom of the second chamber is transferred while influenced by the piston body to the first chamber. The fraction with fibrin 1 deposited on the cylindrical wall in the second chamber is caused to be dissolved by addition of a solvent and by centrifugation, whereafter it is transferred to a receiving container placed within the piston rod by passing after addition of a binder to the enzyme through a filter removing said enzyme, whereby a fibrin-1-containing solution is provided. As the separation of the fraction containing fibrin 1 and the remaining plasma fraction are performed during a continued centrifugation in the device, the fraction containing fibrin 1 is so heavily influenced that said fibrin 1 is efficiently separated from the remaining plasma fraction.

European Application EP 654,699 discloses an apparatus for initiating such a centrifuging. This apparatus comprises a housing which is basically divided into three compartments, viz. an upper compartment, a central compartment, and a lower compartment. The container with the fluid to be separated is placed in the central compartment. It is placed on a rotatable turntable which is rotatably journalled on a journalling shaft, said shaft constituting an output shaft of a motor which is housed in the lower compartment. Accordingly, this motor constitutes a means for generating the high rotational speed at which the container is to be rotated about its central axis at a number of process steps. The latter process steps correspond to the separating process which the fluid is to be subjected to in order to be separated into the desired fluid components. The container is retained on the turntable by means of gripping means engaging openings shaped along the lower rim of the container. Two motors are arranged in the upper compartment. One of these two motors co-operates with a gripping means which is rotatably journalled and adapted to be vertically displaced so as to engage and co-operate with the piston rod of the container. The other motor is adapted to activate a bar, which in turn activates a receiving container provided inside the piston rod and in which the separated component is finally collected during the centrifugation. This centrifuge apparatus corresponds to the apparatus described in the introduction to the specification.

BRIEF DESCRIPTION OF THE INVENTION

The object of the invention is to provide an apparatus allowing an easy and reliable engagement of the lower rim of the cylindrical member as well as of the upper end of the piston rod independent of the rotating position of the container.

In satisfaction of the foregoing object the first gripping means is adapted to automatically enter a locking engagement with the inner side of the cylindrical member independent of the rotating position of the container relative to the supporting turntable and upon activation of a third activating means when said container is placed on the supporting turntable, and the second gripping means is adapted to succeedingly and automatically enter a locking engagement with the piston rod upon activation of a fourth activating means.

In this manner a directly activated engagement of the two ends of the container is ensured by a direct activation of the respective activating means, and further the piston rod is retained in a locked connection with the second gripping means while said second gripping means is vertically displaced when the second activating means is activated.

The first gripping means may according to the invention comprise a plurality of locking legs, which at a simultaneous activation of the third activating means are moved in and out of engagement with the inner side of the cylindrical member at the lower rim of the container, and abutments may be provided in alignment with the free ends of the locking legs, said abutments being provided for the abutment against the outer side of the container. As a result a simple retaining of the lower rim of the container is ensured when the locking legs enter the engagement with the lower rim of said container.

It is according to the invention particularly preferred that the locking legs are identical, projecting legs on a plate-shaped body of a resilient material, and where each locking leg rests on a ridge on a turntable, said ridge being positioned immediately inside the lower rim of the container when said container is placed on the turntable, and whereby the plate-shaped body is freely rotatably journalled on an axial activating bar provided in the apparatus, said activating bar extending coaxially with the axis of rotation and being able to move the plate-shaped body by means of the third activating means between a substantially cup-shaped releasing state in which a container freely can be arranged on or removed from the supporting turntable, and a planar engaging state in which the free ends of the legs engage the container. The resulting gripping means is extremely simple, and it is easy to manufacture and operates in a reliable manner merely by vertically reciprocating the activating bar in axial direction.

The activating bar may according to the invention comprise an engagement means which by a snapping effect enters or exits the engagement with a resilient locking means when the plate-shaped body engages or disengages a container. As a result, a good retaining of the plate-shaped body in the planar state is obtained, in which said body engages a container in such a manner that a predetermined resistance is to be overcome in order to force said plate-shaped body out of the planar state.

The locking means may particularly advantageously be a stationary, rectilinear spring bar, and the engaging means in the activating bar may be a transverse groove.

The second gripping means may according to the invention be freely rotatably retained in connection with the second activating means and comprise a supporting ring with an inner circumferential recess, which is provided on the side facing the piston rod and is adapted to receive the free end of the piston rod by way of a displacement towards said piston rod by means of the second activating means, said supporting ring on the inner side carrying a coaxially accommodated, fixed coupling ring with substantially axially extending, resilient locking webs, which in turn extend forwards towards said recess, the free ends of said locking webs being positioned at the inner side of the piston rod when said piston rod is received in the recess, and whereby a biased, axially displaceable locking sleeve is coaxially arranged inside the coupling ring, said locking sleeve being forced by means of a spring into a locking position in which it has pressed the resilient locking webs of the coupling ring into a releasable engagement with the piston rod by way of a cam follower action, and whereby an activating bar is displaceably accommodated inside the locking sleeve, said activating bar being adapted to enter an engagement with the locking ring by means of the fourth activating means so as to pull said locking sleeve out of the locking engagement with the locking webs of the coupling ring against the force of the spring. In this manner a particularly simply manufactured second gripping means is obtained, which easily engages and disengages the piston rod of a container.

The fourth activating means and the associated activating bar may according to the invention advantageously be displaceably accommodated together with the second gripping means.

At the end opposite the free ends of the locking webs, the coupling ring may according to the invention comprise a circumferential flange which is permanently abutting a radial collar surface on the supporting ring by means of clamping means, said clamping means comprising an axial, through opening allowing free passage of the activating bar, and where said clamping means further comprises a radial, inner contact face for the spring co-operating with the locking sleeve. The resulting locking sleeve is particularly simple and furthermore easy to mount.

The locking sleeve and the clamping means of the coupling ring may according to the invention comprise telescopically co-operating members in such a manner that an efficient guidance of the locking sleeve is ensured.

Furthermore, the activating bar may according to the invention be provided with an end projecting axially downwards towards the supporting turntable, said end being such that when it is activated by means of the fourth activating means it is adapted to enter a frictional engagement with the members inside the piston rod so as to activate said members independent of the activation of the second activating means of the piston rod. The resulting activating bar can in a simple manner be used for activating both the second gripping means and for instance the container inside the piston rod which is to receive the component to be separated.

Finally, the free ends of the locking webs of the coupling ring may according to the invention comprise projections adapted to grip below a circumferential inner projection on the piston rod of the container in question with the result that the retaining thereof is particularly efficient.

BRIEF DESCRIPTION OF THE DRAWINGS

The invention is explained in greater detail below with reference to the accompanying drawing, in which.

DESCRIPTION OF THE PREFERRED EMBODIMENTS OF THE INVENTION

Figure 1:
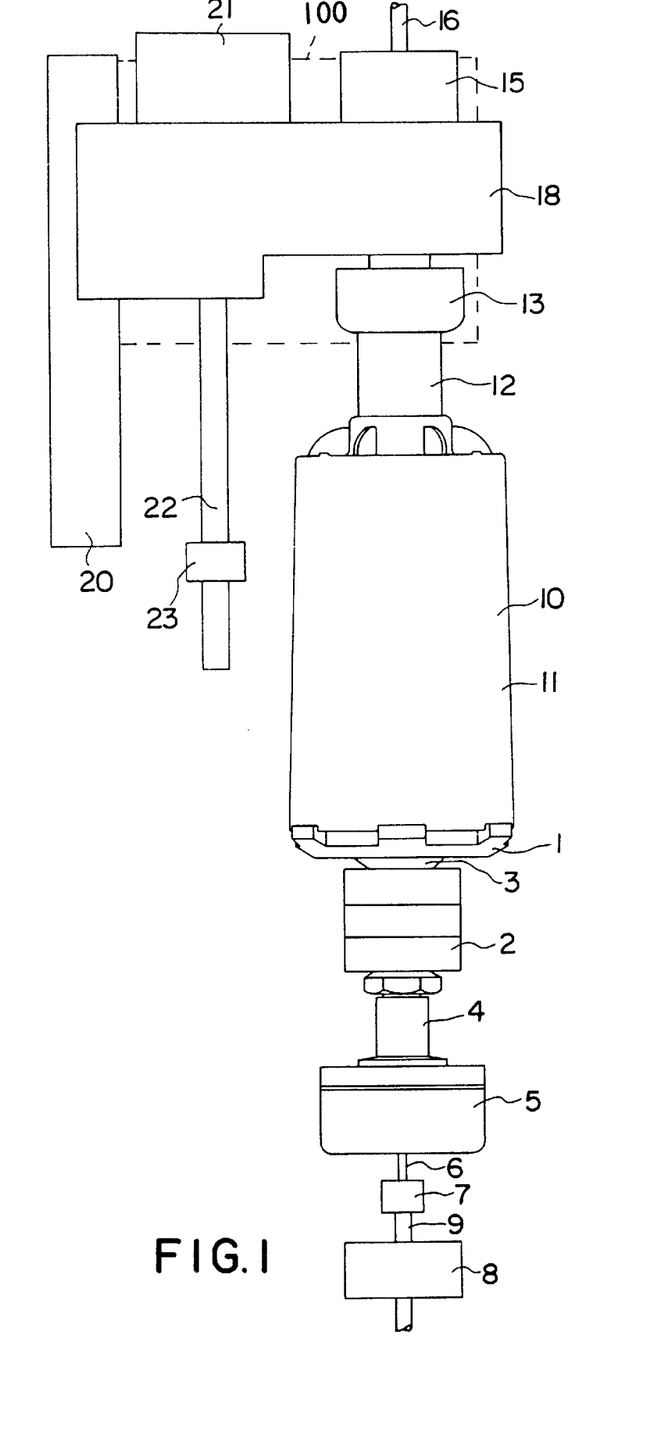
FIG. 1 is a diagrammatic front view of parts of the apparatus according to the invention and with a container arranged therein for the separation of components of a liquid.
Figure 2:
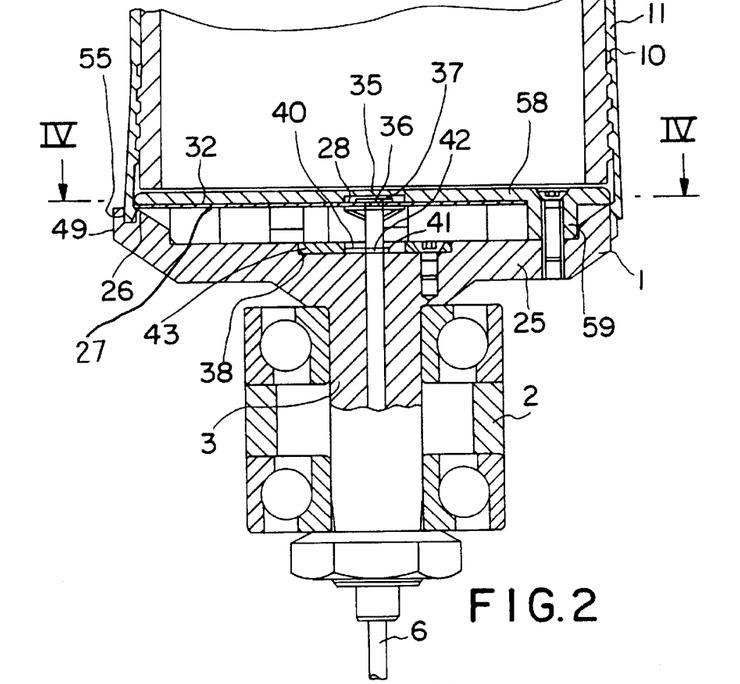
FIG. 2 is a sectional view taken along the line II—II of FIG. 3 of the supporting turntable shown in FIG. 1, on which the container is arranged and through which said container is subjected to a centrifuging, and where parts have been removed for the sake of clarity.

The apparatus shown in FIG. 1 comprises a supporting turntable 1 which is rotatably journalled in a housing not shown in greater detail by means of a ball bearing 2, cf. FIG. 2. The supporting turntable is formed integral with a vertical driving shaft 3. The driving shaft is connected through a coupling 4 to a motor 5 causing the supporting turntable to follow a rotating movement about a vertical axis of rotation. An activating bar 6 is rotatably journalled coaxially with the axis of rotation inside the driving shaft 3 of the supporting turntable 1, said activating bar 6 being connected through a coupling 7 with a spindle motor 8 with a spindle 9 in such a manner that when the spindle motor 8 is activated the activating bar 6 can be displaced vertically upwardly or downwardly as described in greater detail below.

A container 10 is arranged on top of the supporting turntable, said container being of the type described in the said U.S. Pat. No. 5,603,845 and comprising a cylindrical member 11 and a piston not shown in greater detail. The piston is driven by means of a tubular piston rod 12 projecting upwardly from the upper end of the container 10. The piston rod 12 is activated by means of a gripping means 13, which in turn is activated by means of a spindle motor 15 through a spindle 16 and a activating bar 17 connected thereto, cf. FIG. 5 and the following description. The gripping means 13 is furthermore rotatably journalled in a housing 18 through a ball bearing 19. The housing 18 and the spindle motor 15 are secured to a common carrier indicated by means of dotted lines at the reference numeral 100. This carrier 19 is displaceably mounted on a rail 20 and caused to be vertically displaced thereon by means of a motor 21. The motor 21 co-operates through a ball spindle with a ball nut 23 stationarily secured in the apparatus in such a manner that a rotation of the ball spindle 22 by means of the motor 21 causes a movement of the carrier 100 and consequently of the gripping means 13 along the slide 20.

Figure 3:
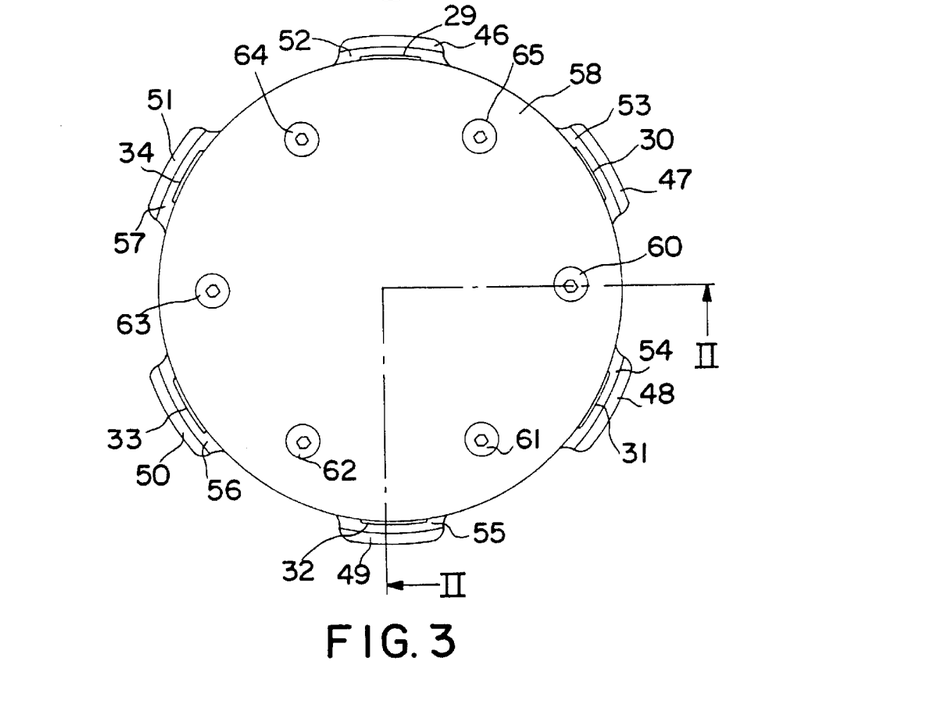
FIG. 3 is a top view of the supporting turntable.
Figure 4:
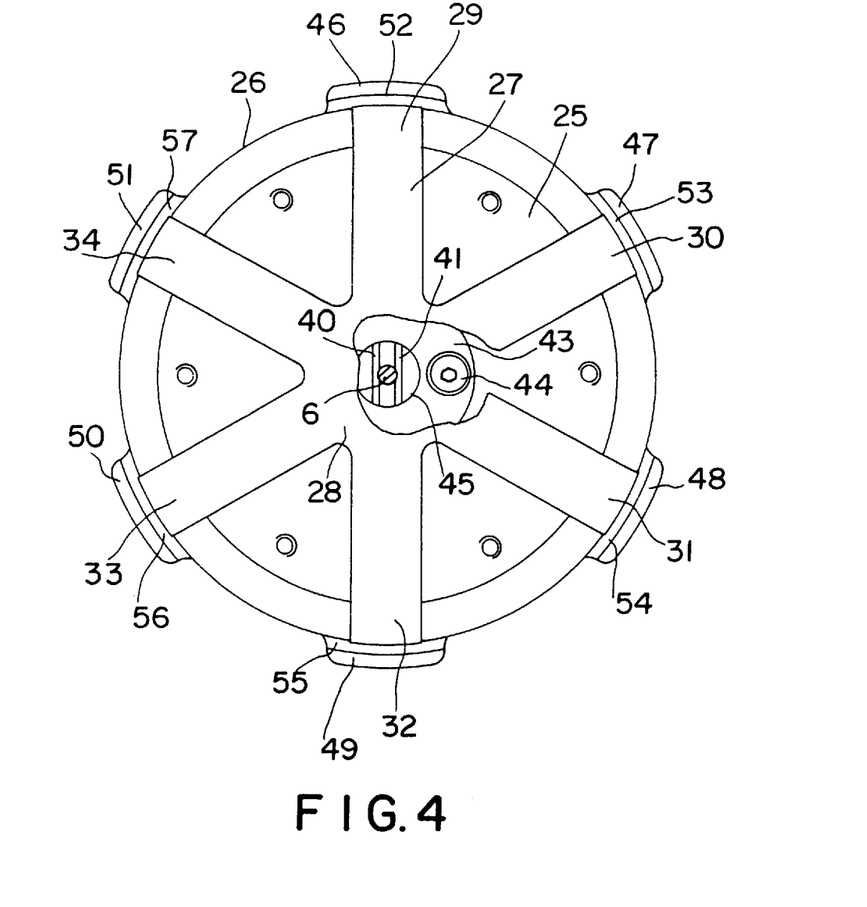
FIG. 4 is a sectional view taken along the line IV—IV of FIG. 2, parts of the turntable being removed for the sake of clarity.

As illustrated in FIGS. 2–4, the supporting turntable 1 comprises a cup-shaped bottom part 25 with a circumferential ridge 26, on which a locking body 27 of a thin plate-shaped material is arranged. This locking body 27 comprises a central portion 28, from which six legs 29–34 extend in the illustrated embodiment. The legs 29–34 are dimensioned such that in the state shown in the drawing they project beyond the outer side of the ridge 26 to such an extent that they can enter a locking engagement with the inner side of the cylindrical portion 11 of the container 10 behind a small circumferential collar thereon. The free edges of the legs 29–34 are cut along a circular line. In the middle, the locking body 27 is loosely arranged on the upper end of the activating bar 6, said bar extending through an opening 35 in the middle of said locking body 27. In addition, the locking body 27 is secured against an axial displacement on the activating bar 6 by means of locking means 36, 37 provided on each side of said locking body 27.

A circular recess 38 is centrally provided at the bottom of the cup-shaped bottom part 25, two rectilinear lengths 40 and 41, respectively, of a piano string being arranged in said recess. In the position of the activating bar 6 shown in the drawing, the two lengths of piano string abut their respective side of said activating bar while engaging a circumferential groove 42 thereon. The piano strings are maintained in position in the bottom of the recess 38 by means of a disk 43 with associated grooves for receiving said piano strings 40, 41. The disk 43 is secured to the cup-shaped bottom part 25 by means of screws 44. The disk 43 is shaped with a central opening 45 of a suitable diameter so as to allow the piano strings 40 and 41 to yield and enter or exit the engagement with the circumferential groove 42 in the activating bar 6 when said bar is vertically displaced in axial direction.

When the activating bar 6 is vertically displaced in axial direction, i.e. from the position shown in the drawing, in which the locking body 27 is in a planar state, and into the position, in which the activating bar 6 is moved downwards and the planar locking body 27 has been caused to enter a state bulging downwards, said locking body 27 is forced out of its engagement with the container 10. When the activating bar 6 is reextended in an upward direction relative to FIG. 2, the locking body 27 is returned to the shown planar state in which it can engage the container 10. The locking body 27 is fixed in the horizontal position by the engagement of the piano strings 40, 41 with the groove 42 on the activating bar 6, and in order to move the activating bar 6 downwards and away from said position the spindle motor 8 must overcome a minor force caused by the engagement of said piano strings 40, 41 with the groove 42.

A projection 46–51 is shaped on the cup-shaped bottom part 25 opposite each leg 29–34 of the locking body 27 in order to improve the engagement of said locking body 27 with the container 10. These projections 46–51 are provided with a groove 52–57, respectively, for receiving the lower rim of the container 10, the outer groove 52–57 forming an outer support for the rim of the container 10 when the legs 29–34 of the locking body 27 are pressed against the container 10.

A circular lid 58 is mounted on top of the cup-shaped bottom part 25 for the protection of the locking body 27. The lid 58 comprises downwardly extending projections, cf. the projection 59 shown in FIG. 2. Each of the projections 59 abuts the bottom of the bottom part 25 in such a manner that the bottom side of the lid 58 is suitably spaced from the locking body 27 and does not interfere with the movement thereof. The lid 58 is secured to the bottom part 25 by means of screws 60–65. The projections 59 pass downwards, cf. the drawing, between the legs 29–34 of the locking body 27 and can be dimensioned such that they serve as side guide for the locking body 27 with the result that said locking body does not have a tendency to rotate away from a position in which the legs 29–34 are positioned immediately opposite the projections 46–51 on the bottom part 25.

Figure 5:
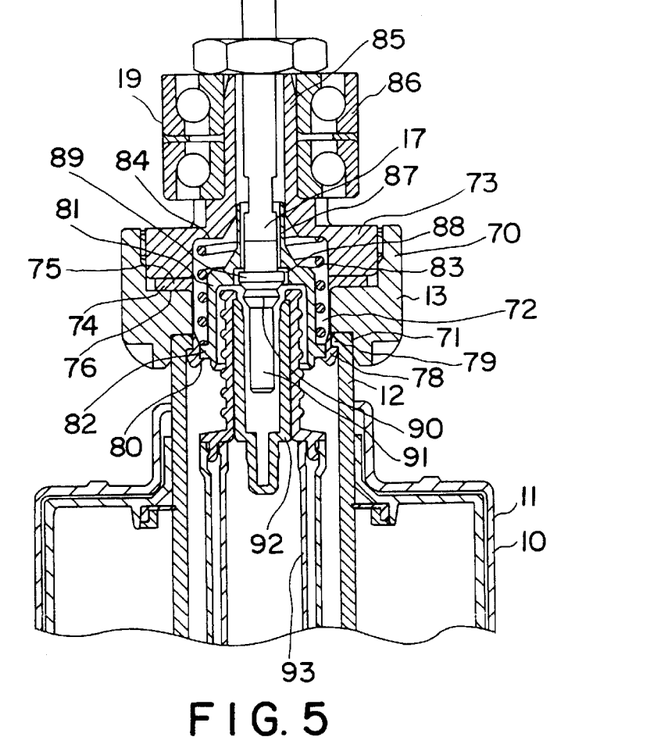
FIG. 5 is a vertical sectional view through the gripping means of FIG. 1 for gripping and handling the piston rod of the container, where adjacent members of the container are shown.

The gripping means 13 shown in FIG. 5 comprises a supporting ring 70 with an inner circumferential recess 71 on the side adjacent the container. The circumferential recess 71 is adapted to receive the upper end of the piston rod 12 of the container 10 in such a manner that the inner side of the piston rod 12 flushes substantially with the inner side of the through opening 72 of the supporting ring 70.

Figure 6:
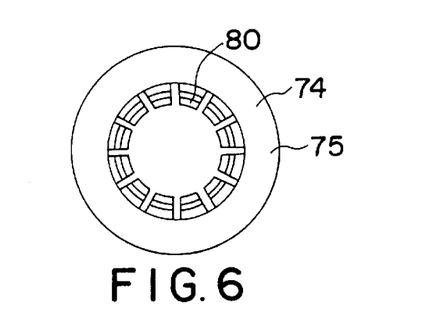
FIG. 6 is a top view of a coupling ring placed in the gripping means of FIG. 5.
Figure 7:
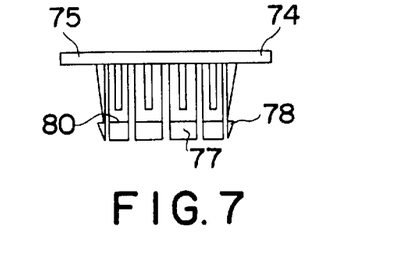
FIG. 7 is a side view of the coupling ring of FIG. 6.

A coupling ring 74 is secured inside the supporting ring 70 by means of a clamping means 73. The clamping means 73 is provided with an external thread engaging an internal thread on the supporting ring 70 in a circumferential recess therein on the side opposite the piston rod 12. This coupling ring is illustrated in greater detail in FIGS. 6 and 7. As illustrated, the coupling ring 74 comprises a circumferential flange 75 abutting a radial collar face 76 on the supporting ring 70. Axial locking webs 77 extend from the flange 75. In the illustrated embodiment, the coupling ring 74 comprises twelve locking webs. These locking webs extend coaxially forwards towards the side of the supporting ring 70 adjacent the piston rod 12 along the inner side of the through opening 72 of said supporting ring. At their free ends, each locking web 77 comprises an outwardly extending projection 78 which engages below a circumferential projection 79 projecting inwardly on the adjacent end of the piston rod 12. On the inner side, the locking webs 77 of the coupling ring 74 comprise their respective radial stop face 80. When mounted inside the supporting ring 70, the locking webs 77 of the coupling ring 74 and the associated projections 78 are radially inwardly displaced towards the central axis of the supporting ring 70 to such an extent that the piston rod 12 can pass freely in and out of the circumferential recess 71 in said supporting ring 70. When the locking webs 77 are pressed radially outwards, they enter a locking engagement with the inner side of the piston rod 12, the outer projections 78 of the locking webs 77 engaging below the circumferential inner projection 79 of the piston rod 12.

The locking webs 77 are pressed outwards by means of a locking sleeve 81 coaxially mounted inside the supporting ring 70, said locking sleeve 81 on the outside comprising a circumferential flange 82. The circumferential flange 82 serves in a cam-like manner to slide against the inner side of the locking webs 77 of the coupling ring 74 until it abuts the stop face 80 thereof. In addition, the circumferential flange 82 serves to abut a spring 83 pressing the locking sleeve 81 forwards towards the abutment against the inner stop face 80 of the locking webs 77. At the end of the locking sleeve 81 opposite the flange 82, this spring 83 abuts a radially inwardly projecting stop face 84 on the clamping means 73.

The clamping means 73 comprises a tubular portion 85 extending coaxially with the supporting ring 70. On the outside the tubular portion 85 serves to secure the gripping means 13 in a ball bearing 86 present in the housing 18, and on the inside it serves as guide for a coaxially extending tubular portion 87 shaped integral with the locking sleeve 81. This tubular portion 87 is of an inner diameter being smaller than in the opposite end of the locking sleeve 81 adjacent the end of the supporting ring 70 receiving the piston rod 12. In this manner, a circumferential recess 88 is provided for receiving a circumferential projection 89 on the activating bar 17 in such a manner that said activating bar 17 engages the recess 88 when it is pulled out, i.e. moved upwards relative to FIG. 5 and causes the locking sleeve 81 to follow upwards and out of the engagement with the stop face 80 of the locking webs 77 of the coupling ring 74. As a result, the locking webs 17 disengage the piston rod 12. The activating bar 77 is, as mentioned, activated by means of the spindle motor 15. At the end facing away from the spindle motor 15, the activating bar 17 comprises portions 90, 91 which by movement of the activating bar downwards towards the piston rod 12 are adapted to engage members 92 accommodated inside the piston rod 12 in the container 10 in connection with a syringe 93 not shown in greater detail with the effect that said syringe can be suitably activated from the outside through the activating bar 17.

When the described apparatus is used, the container 10 is placed on the supporting turntable 1, the lower rim of the cylindrical member 11 being received in the grooves 52–57 in the projections 46–51 on said supporting turntable 1. While the container 10 is being placed, the legs 29–45 of the locking body 27 are retracted by means of the associated spindle motor 8. As soon as the container has been positioned, the spindle motor 8 is activated so as to push the activating bar 6 upwards with the result that the locking body 27 is caused to enter a locking engagement with the inner side of the container. While the container 10 is being positioned, the locking sleeve 81 is kept in an upper position relative to FIG. 5 through the activating bar 17 by means of the spindle motor 15 in such a manner that the locking sleeve 81 is pulled out of the locking engagement with the coupling ring 81 in a direction opposite the biasing force of the spring 83. As a result, the gripping means 13 can the pushed downwards by means of the motor 21 so as to receive the upper end of the piston rod 12 in the recess 71 of the supporting ring 70. Subsequently, the piston rod 12 is pushed forwards by the spindle motor 15 so as to release the locking sleeve 81 in such a manner that said locking sleeve 81 by means of the force of the spring 83 can press the locking webs 77 of the coupling ring 74 into an engagement with the inner side of the piston rod 12 and fixedly lock said piston rod 12 in the gripping means 13. The activating bar 17 is moved so far forwards that it disengages the locking sleeve 81 in the locked state thereof. The activating bar 17 is besides dimensioned such that in this state it does not come into contact with the remaining members of the gripping means 13, whereby these members can follow the rotation when the container 10 is subsequently caused to rotate by means of the motor 5.

Various control means not shown in greater detail are accommodated inside the apparatus, said control means initiating the various movements to be performed during the centrifuging and handling of the container 10. These control means are also adapted to provide the container 10 with the necessary rotational speeds in a conventionally known manner.

The individual members of the apparatus are made of suitable materials. Thus the locking body may suitably be made by a punching out of stainless spring steel of a thickness of 0.6 mm. The coupling ring 74 is suitably made of stainless steel by a turning and spark machining.

The invention has been described with reference to a preferred embodiment. Many modifications can be carried out without thereby deviating from the scope of the invention.

The invention claimed is:

1. An apparatus for centrifuging and automatically handling a container for the separation of liquid components, where said container comprises a cylindrical member with a lower rim as well as a piston member with a tubular piston rod projecting upwardly from the upper end of the cylindrical member, and where said apparatus comprises a supporting turntable integral with a first gripping means for releasably gripping said lower rim of the cylindrical member when the container is placed onto said supporting turntable, said supporting turntable being connected to a first activating means for rotating said turntable with the container about the longitudinal axis of said turntable, and where said apparatus further comprises a rotatably journalled piston activating mechanism adapted to activate the tubular piston rod by means of a second activating means, said apparatus further comprising a second gripping means for releasably gripping said tubular piston rod, further wherein the first gripping means is adapted to automatically enter a locking engagement with an inner side of the cylindrical member independent of the rotating position of the container relative to the supporting turntable and upon activation of a third activating means when said container is placed on the supporting turntable, and wherein the second gripping means is adapted to succeedingly and automatically enter a locking engagement with the tubular piston rod upon activation of a fourth activating means integral with said second gripping means.

2. An apparatus as claimed in claim 1, wherein the first gripping means comprises a plurality of locking legs, which at a simultaneous activation of the third activating means are moved in and out of engagement with the inner side of the cylindrical member at the lower rim of the container, and that abutments are provided in alignment with free ends of the locking legs, said abutments being provided for abutment against an outer side of the container.

3. An apparatus as claimed in claim 2, wherein the locking legs are identical, radially projecting legs on a plate-shaped body of a resilient material, and which body abuts a ridge on said supporting turntable, said ridge being positioned immediately inside the lower rim of said container when said container is placed on said turntable, and that the plate-shaped body is freely rotatably journalled on an axial activating bar provided in the apparatus, said activating bar extending coaxially with said longitudinal axis and being able to move the plate-shaped body by means of the third activating means between a substantially cup-shaped release state in which said container freely can be arranged on or removed from the supporting turntable, and a planar engaging state in which the free ends of the legs engage the container.

4. An apparatus as claimed in claim 3, wherein the activating bar comprises an engagement means which by a snapping effect enters or exits a releasably interlocking relationship with a resilient locking means when the plate-shaped body engages or disengages said container.

5. An apparatus as claimed in claim 4, wherein the locking means is a stationarily arranged, rectilinear spring bar, and that the engagement means in the activating bar is a transverse groove.

6. An apparatus as claimed in claim 1, wherein the second gripping means is freely rotatably retained in connection with the second activating means and which second gripping means comprises a supporting ring with an inner circumferential recess which is provided on the side facing the piston rod and is adapted to receive a free end of the piston rod by way of a displacement towards said piston rod by means of the second activating means, wherein the supporting ring on an inner side carries a coaxially freely accommodated, fixed coupling ring with substantially axially extending, resilient locking webs, which in turn extend forwards towards said recess, free ends of said locking webs being positioned at an inner side of the piston rod when said piston rod is received in the recess, and wherein a biased, axially displaceable locking sleeve is coaxially arranged inside the coupling ring, said locking sleeve being forced by means of a spring into a locking position in which said spring has pressed the resilient locking webs of the coupling ring into a releasable engagement with the piston rod by way of a cam follower action, and wherein an activating bar is displaceably accommodated inside the locking sleeve, said activating bar being adapted to enter an engagement with the locking sleeve by means of the fourth activating means so as to pull said locking sleeve out of the locking engagement with the locking webs of the coupling ring against the force of the spring.

7. An apparatus as claimed in claim 6, wherein the fourth activating means and the associated activating bar are displaceably accommodated together with the second gripping means.

8. An apparatus as claimed in claim 7, wherein at the end opposite the free ends of the locking webs, the coupling ring comprises a circumferential flange which is permanently abutting a radial collar surface on the supporting ring by means of a clamping means, said clamping means comprising an axial, through opening allowing free passage of the activating bar, and where said clamping means further comprises a radial, inner contact face for the spring co-operating with the locking sleeve.

9. An apparatus as claimed in claim 8, wherein the locking sleeve and the clamping means comprise telescopically co-operating members.

10. An apparatus as claimed in claim 6, wherein the activating bar comprises an end projecting axially downwards towards the supporting turntable, said end being such that when it is activated by means of the fourth activating means it is adapted to enter an engagement with members inside the piston rod so as to activate said members independent of the activation of the second activating means of the piston rod.

11. An apparatus as claimed in claim 6, wherein the free ends of the locking webs of the coupling ring comprise projections adapted to grip below a circumferential inner projection on the piston rod of the container.

12. An apparatus for centrifuging and automatically handling a container for the separation of liquid components where said container comprises a cylindrical member with an inner lower rim and an upper end, and where said apparatus comprises a supporting turntable integral with a first gripping means for releasably gripping said lower rim from inside the bottom of said cylindrical member when the container is placed onto said turntable, said turntable being connected to a first activating means for rotating said turntable with the container about the longitudinal axis of said turntable, and where said apparatus further comprises a second gripping means for releasably gripping said upper end of said container, further wherein the first gripping means is adapted to automatically, upon activation of a separate activating means, enter a locking engagement with an inner side of said cylindrical member independent of the rotating position of the container relative to the supporting turntable, and wherein the second gripping means is adapted to succeedingly and automatically enter a locking engagement with the upper end upon activation of an additional activating means.

13. The apparatus of claim 12 wherein the first gripping means comprises a plurality of locking legs which at a simultaneous activation of the separate activating means are moved in and out of engagement with the inner side of the cylindrical member at the lower rim of the container and that abutments are provided in alignment with free ends of the locking legs, said abutments being provided for abutment against an outer side of the container.

14. An apparatus as claimed in claim 13, wherein the locking legs are identical, radially projecting legs on a plate-shaped body of a resilient material, and which body abuts a ridge on said supporting turntable, said ridge being positioned immediately inside the lower rim of the container when said container is placed on said turntable and that the plate-shaped body is freely rotatably journalled on an axial activating bar provided in the apparatus, said activating bar extending coaxially with the longitudinal axis and being able to move the plate-shaped body by means of the separate activating means between a substantially cup-shaped release state in which the container freely can be arranged on or removed from the supporting turntable, and a planar engaging state in which the free ends of the legs engage the container.

15. An apparatus as claimed in claim 14, wherein the activating bar comprises an engagement means which by a snapping effect enters or exits a releasably interlocking relationship with a resilient locking means when the plate-shaped body engages or disengages said container.

16. An apparatus as claimed in claim 15, wherein the locking means is a stationarily arranged, rectilinear spring bar, and that the engagement means in the activating bar is a transverse groove.

17. An apparatus for centrifuging and automatically handling a container for the separation of liquid components where said container comprises a bottom end as well as a piston member with a tubular piston rod projecting upwardly from an upper end of the container, and where said apparatus comprises a supporting turntable integral with a first gripping means for releasably gripping said bottom end when the container is placed onto said turntable, said supporting turntable being connected to a first activating means for rotating said turntable with the container about the longitudinal axis of said turntable and where said apparatus further comprises a rotatably journalled piston activating mechanism adapted to activate the tubular piston rod and which comprises a second activating means for moving said second gripping means in a desired longitudinal direction and which is integral with a second gripping means for releasably gripping said tubular piston rod further wherein the first gripping means is adapted to automatically enter a locking engagement with the bottom end independent of the rotating position of the container relative to the supporting turntable and upon activation of a third activating means when said container is placed on the supporting turntable, and wherein the second gripping means is adapted to succeedingly and automatically enter a locking engagement with the tubular piston rod upon activation of a fourth activating means integral with said second gripping means.

18. An apparatus of claim 17 wherein the second gripping means is freely rotably retained in connection with the second activating means and wherein said second gripping means comprises a supporting ring with an inner circumferential recess which is provided on the side facing the piston rod and is adapted to receive a free end of the piston rod by way of a displacement towards said piston rod by means of the second activating means wherein the supporting ring on an inner side carries a coaxially freely accommodated, fixed coupling ring with substantially axially extending, resilient locking webs, which in turn extend forwards towards said recess, free ends of said locking webs being positioned at an inner side of the piston rod when said piston rod is received in the recess, and wherein a biased, axially displaceable locking sleeve is coaxially arranged inside the coupling ring, said locking sleeve being forced by means of a spring into a locking position in which said spring has pressed the resilient locking webs of the coupling ring into a releasable engagement with the piston rod by way of a cam follower action, and wherein an activating bar is displaceably accommodated inside the locking sleeve, said activating bar being adapted to enter an engagement with the locking sleeve by means of the fourth activating means so as to pull said locking sleeve out of the locking engagement with the locking webs of the coupling ring against the force of the spring.

19. An apparatus as claimed in claim 18, wherein the fourth activating means and the associated activating bar are displaceably accommodated together with the second gripping means.

20. An apparatus as claimed in claim 19, wherein at the end opposite the free ends of the locking webs, the coupling ring comprises a circumferential flange which is permanently abutting a radial collar surface on the supporting ring by means of a clamping means, said clamping means comprising an axial, through opening allowing free passage of the activating bar, and where said clamping means further comprises a radial, inner contact face for the spring co-operating with the locking sleeve.

21. An apparatus as claimed in claim 20, wherein the locking sleeve and the clamping means comprise telescopically co-operating members.

22. An apparatus as claimed in claim 18, wherein the activating bar comprises an end projecting axially downwards towards the supporting turntable, said end being such that when it is activated by means of the fourth activating means, it is adapted to enter an engagement with members inside the piston rod so as to activate said members independent of the activation of the second activating means of the piston rod.

23. An apparatus as claimed in claim 18, wherein the free ends of the locking webs of the coupling ring comprise projections adapted to grip below a circumferential inner projection on the piston rod of the container.

\* \* \* \* \*